Figure 1:
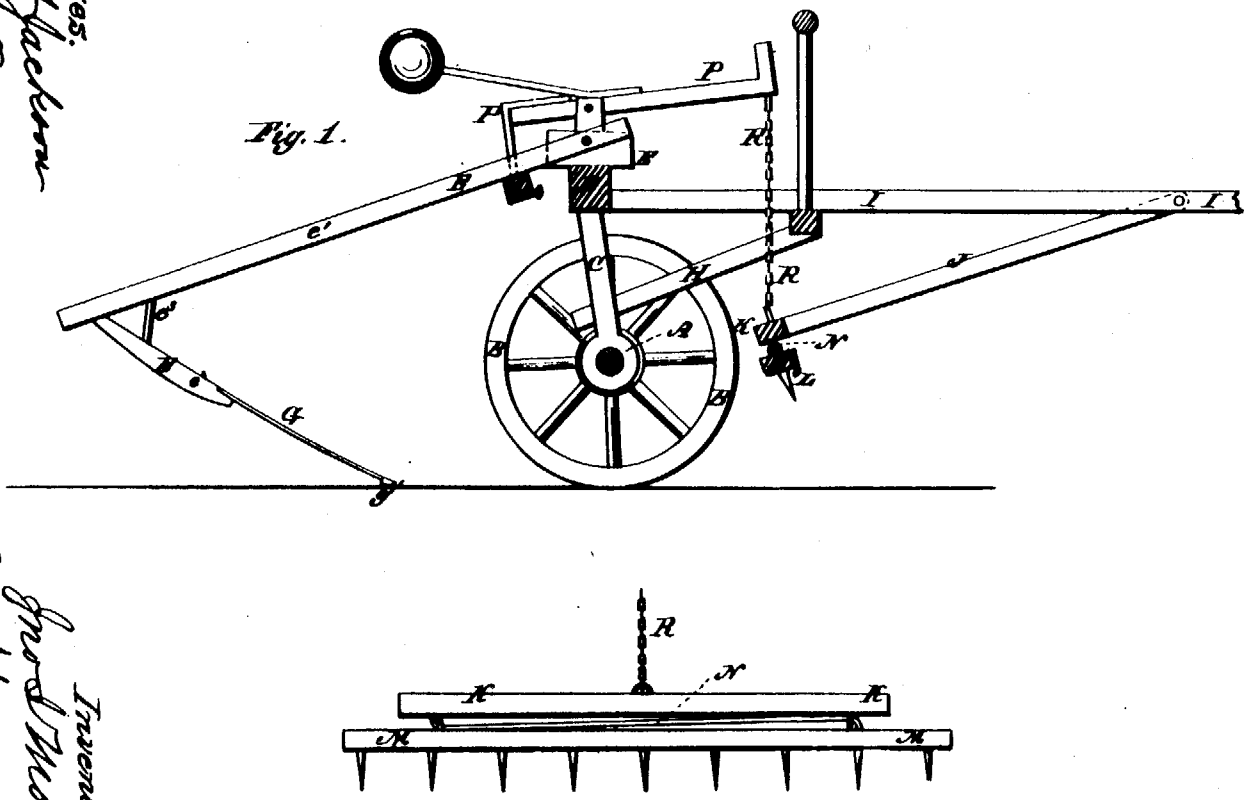

J. I. Monroe.

Horse Rake.

No. 3,370. Reissued Apr. 13, 1869.

Witnesses.
F. A. Jackson
Wm Freurn

Inventor
Jno I Monroe
Per Munn & Co.

H. PETERS, PHOTO-LITHOGRAPHER, WASHINGTON, D. C.

UNITED STATES PATENT OFFICE.

JOHN I. MUNROE, OF WOBURN, MASSACHUSETTS.

IMPROVEMENT IN HORSE-RAKES.

Specification forming part of Letters Patent No. 63,079, dated March 19, 1867; Reissue No. 3,370, dated April 13, 1869.

*To all whom it may concern:*

Be it known that I, JOHN I. MUNROE, of Woburn, in the county of Middlesex and State of Massachusetts, have invented a new and useful Improvement in Hay-Rakes; and I do hereby declare that the following is a full, clear, and exact description thereof, which will enable others skilled in the art to make and use the same, reference being had to the accompanying drawings, forming a part of this specification, in which—

Figure 1 is a vertical longitudinal section of my improved hay-rake. Fig. 2 is a detail view of the divider.

Similar letters indicate like parts in the several figures.

My invention consists in the combination of a divider with the frame of the rake, so constructed and arranged that when the teeth are raised to discharge the collected hay and form a windrow the divider may at the same time drop down into the spread hay and separate or divide it, so that when the rake-teeth descend, after passing over the windrow, and the divider rises, the said teeth may drop down into the space thus cleared, and no hay be left scattered or trailing behind the rake; also, in combining with the rigid portion of the rake-teeth elastic metallic tips, which come in contact with the ground, and by their elasticity allow the teeth to pass over obstacles without either breaking them or scattering the collected hay, and from their form and position enter the hay more readily than rigid teeth could do; and, also, in so connecting the divider with the rake-teeth that each shall tend to act as a counterpoise to the other when being raised or lowered in working the rake.

In the drawings, A is the axle, and B the wheels, of the rake. C are the uprights that support the frame of the rake. The lower ends of the uprights C are attached to the axle A, and to their upper ends is attached the beam D, upon which the teeth E of the rake are pivoted. To the upper side of the beam D are securely attached blocks F, of a breadth equal to the desired space between the teeth. The upper ends of the long part $e'$ of the teeth E are pivoted between and to these blocks. To the lower ends of the long part $e'$ of the teeth E are securely attached the upper ends of the short part $e^2$ of said teeth. The parts $e'$ and $e^2$ meet each other at an acute angle, and the connection is strengthened by the short braces $e^3$, one end of which is attached to the part $e'$ and the other end to the part $e^2$. By this construction the hay is collected by and drawn along upon the said teeth until the rake-head is full. It is then discharged to form a windrow.

G are elastic tips attached to the lower ends of the parts $e^2$ of the teeth E. These tips come in contact with the ground, and when they encounter an obstruction their elasticity enables them to pass over it without rising so high as to scatter the collected hay. Upon the lower ends of the elastic tips G are formed small knobs or shoes $g'$, so that the said tips may slide freely over the ground.

H are strengthening-braces extending from the lower ends of the uprights C up to the frame of the rake to brace and strengthen it.

I are the draft-bars or thills of the rake, to the outer sides of which, near their forward ends, are pivoted the forward ends of the bars J. The rear ends of the bars J are securely attached to the ends of the cross-bar K.

L are the teeth of the divider, the upper ends of which are secured to the cross-bar or head M in the ordinary manner. The divider-head or cross-bar M is connected with the bar K by the spring-hinge N. The hinge N is formed of a steel rod, one end of which is securely attached to the upper side of the bar M, near one end. It then passes through an eye or staple securely attached to the under side of the bar K, near its end. Thence it passes along between the bars K and M, through an eye or staple attached to the upper side of the bar M, near its other end, and its end is securely attached to the under of the bar K, thus becoming at the same time a hinge to allow the divider-head to give in passing over an obstruction, and a spring to bring it back to the proper position as soon as the obstruction has been passed.

O is a bar extending across the rake below the forward ends of the long parts $e'$ of the rake teeth, a little in the rear of the beam D. This bar is attached to and supported by the lower end of the bent lever P, which is pivoted to suitable supports just above the blocks F, as shown. The forward end of the lever P extends forward into such a position as to be reached and operated by the driver.

R is a chain, the upper end of which is attached to the forward end of the lever P, and its lower end is attached to the bar K of the divider. The chain R is of such a length that when the teeth E are in contact with the ground the divider will be held suspended at such a height as to clear the spread hay; but when the teeth are raised by lowering the forward end of the lever P to discharge the collected hay from the rake the divider will be lowered, so as to come in contact with the ground and divide or separate the spread hay, as before described.

S is a weight suspended from the rear end of the lever P, and is of such a weight as to a little more than balance the divider, so that when the parts are left free the said divider will be held suspended and the teeth of the rake be in contact with the ground.

I do not claim broadly an independent rake-tooth in which the descending part, which collects and carries forward the hay, is formed entirely of steel or other elastic rods; but What I do claim is—

1. The combination of the elastic tip G with the rigid descending bar $e^2$ of teeth E, substantially in manner as described and shown.

2. The divider as constructed with the head M, teeth L, bar K, spring N, and bars J, substantially as described and shown.

3. So connecting the divider-head M with the divider by means of spring N, or its equivalent, as that it shall have an independent yielding or vibratory motion for passing obstacles, substantially as described and shown.

J. I. MUNROE.

Witnesses:
H. K. PORTER,
T. W. PORTER.